United States Patent
de Wergifosse

(10) Patent No.: US 10,633,987 B2
(45) Date of Patent: Apr. 28, 2020

(54) SIMPLIFIED PITCH ACTUATION SYSTEM FOR A TURBINE ENGINE PROPELLER

(71) Applicant: SAFRAN AIRCRAFT ENGINES, Paris (FR)

(72) Inventor: Huguette de Wergifosse, Saint Augustin (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 370 days.

(21) Appl. No.: 15/490,746

(22) Filed: Apr. 18, 2017

(65) Prior Publication Data

US 2017/0306773 A1    Oct. 26, 2017

(30) Foreign Application Priority Data

Apr. 20, 2016 (FR) ..................................... 16 53470

(51) Int. Cl.
| | |
|---|---|
| *F01D 5/18* | (2006.01) |
| *F01D 7/02* | (2006.01) |
| *B64C 11/44* | (2006.01) |
| *F02C 6/20* | (2006.01) |
| *F01D 5/02* | (2006.01) |

(Continued)

(52) U.S. Cl.
CPC ................ *F01D 7/02* (2013.01); *B64C 11/44* (2013.01); *F01D 5/02* (2013.01); *F01D 5/12* (2013.01); *F01D 15/12* (2013.01); *F02C 6/206* (2013.01); *F05D 2220/30* (2013.01); *F05D 2220/324* (2013.01); *F05D 2240/50* (2013.01); *F05D 2260/40311* (2013.01);

(Continued)

(58) Field of Classification Search
CPC ... B64C 11/325; B64C 11/30; B64C 29/0033; F01D 7/00; F05B 2270/328; F03D 7/0224
USPC ........................................ 416/1, 26, 127, 147
See application file for complete search history.

(56) References Cited

U.S. PATENT DOCUMENTS

| | | | | |
|---|---|---|---|---|
| 5,213,471 A | * | 5/1993 | Miller ................... | B64C 11/325 416/129 |
| 5,242,265 A | * | 9/1993 | Hora ....................... | B64C 11/32 416/129 |

(Continued)

FOREIGN PATENT DOCUMENTS

| | | |
|---|---|---|
| FR | 2945680 A1 | 11/2010 |
| FR | 2994707 A1 | 2/2014 |

OTHER PUBLICATIONS

Preliminary Search Report and Written Opinion dated Dec. 9, 2016, issued in corresponding French Application No. 1653470, filed Apr. 20, 2016, 6 pages.

*Primary Examiner* — Long T Tran
*Assistant Examiner* — James J Kim
(74) *Attorney, Agent, or Firm* — Christensen O'Connor Johnson Kindness PLLC

(57) ABSTRACT

A pitch actuation system for a turbine engine propeller, comprising an actuator, a movable part of which is designed to be connected to blades of the propeller so as to rotate said blades relative to blade pitch-setting axes, wherein the actuator is an electromechanical actuator and comprises at least two electric motors for driving a common rotor, and a transmission screw rotated by the common rotor, and in that the system further comprises a nut, through which the transmission screw passes and which is designed to cooperate with the blades so as to move them.

11 Claims, 2 Drawing Sheets

(51) Int. Cl.
*F01D 5/12* (2006.01)
*F01D 15/12* (2006.01)

(52) U.S. Cl.
CPC ...... *F05D 2260/57* (2013.01); *F05D 2260/74* (2013.01); *F05D 2260/79* (2013.01); *F05D 2270/62* (2013.01)

(56) References Cited

U.S. PATENT DOCUMENTS

| | | | | |
|---|---|---|---|---|
| 5,451,141 | A * | 9/1995 | Carvalho | B64C 11/44 416/152 |
| 8,167,553 | B2 * | 5/2012 | Perkinson | B64C 11/36 416/1 |
| 8,740,565 | B2 * | 6/2014 | Perkinson | B64C 11/48 416/129 |
| 2004/0042897 | A1 | 3/2004 | Pietricola | |
| 2009/0314884 | A1 * | 12/2009 | Elliott | B64C 13/34 244/99.9 |
| 2010/0021295 | A1 * | 1/2010 | Perkinson | B64C 11/06 416/1 |
| 2010/0310368 | A1 | 12/2010 | Perkinson et al. | |
| 2011/0274545 | A1 * | 11/2011 | Morgan | B64C 11/32 416/151 |
| 2013/0170988 | A1 * | 7/2013 | Guey | F03D 7/0224 416/9 |
| 2016/0281732 | A1 * | 9/2016 | Lardy | F04D 29/30 |
| 2017/0283036 | A1 * | 10/2017 | Garassino | F16H 21/54 |

* cited by examiner

SIMPLIFIED PITCH ACTUATION SYSTEM FOR A TURBINE ENGINE PROPELLER

FIELD OF THE DISCLOSURE

Embodiments of the present disclosure relate generally to a pitch actuation system for a propeller of a turbine engine, such as a turboprop engine.

BACKGROUND

The prior art particularly comprises documents U.S. Publication No. 2010/021295A1, U.S. Publication No. 2004/042897A1, French Publication No. 2945680A1, French Publication No. 2994707, and U.S. Publication No. 2010/310368A1.

A turboprop engine comprises at least one propeller comprising a hub and blades supported by the hub and extending substantially radially outwards relative to the hub and to the axis of rotation of the propeller.

The turboprop engine is generally equipped with a propeller pitch actuation system, also called a propeller blade angular pitch system. Adjusting the pitch of the propeller blades allows their efficiency to be improved while guaranteeing a propeller rotational speed for each flight phase.

Each blade can be rotated about an axis, which is generally radial, between a first emergency position, called the feathering position, in which it extends substantially parallel to the axis of rotation of the propeller, and a second position, in which it is sharply inclined relative to this axis. It can adopt any position between these two extreme positions.

In the prior art, the actuation system that is used is a hydraulic system, which is relatively complex and has several disadvantages. This system comprises an actuator, a movable part of which is connected to the propeller blades so as to adjust their pitch.

The actuation system must be able to provide not only the pitch control function, but also the emergency blade feathering function. The pitch actuation system thus comprises an auxiliary system for the emergency function.

A malfunction associated with a leak in the hydraulic system, which is a mode common to the pitch control system and the auxiliary system, must be covered. Without a pressure source, it is essential that counterweights are added to the blades in order to provide the feathering function.

The pitch actuation system also must provide protection functions in the event of overspeed, in the event of engine cut-out, in the event of a failure of the FADEC (Full Authority Digital Engine Control) computer, and must ensure that low pitches in flight are limited. A set of mechanical systems and of hydraulic systems thus form part of the pitch actuation system for providing these functions in the prior art.

The pitch control system is also subject to extremely strict malfunction rate requirements, which involve redundancies and additional protection systems.

To conclude, the technology and the operating principle of a hydraulic propeller pitch actuation system are currently complex. These systems are integrated in a wide range of hydraulic components.

SUMMARY

Embodiments of the present disclosure make it possible to overcome these disadvantages and provides a solution to all or some of the aforementioned problems of the prior art.

The first problem (problem A) relates to the strict FHA (Functional Hazard Assessment) requirements for pitch control, which involve robust architectures with redundancy.

The second problem (problem B) relates to the feathering function, which must be able to be provided even after a failure of the pitch control.

The third problem (problem C) relates to the risk of locking of the movable part of the actuator. In a hydraulic system, a blade of the propeller is rotated by the translational movement of an eccentric member at the root of the blade. Axial locking of the hydraulic cylinder is considered to be a failure.

Furthermore, in a hydraulic system, the rotation of the propeller is transmitted to the hydraulic actuator positioned in the rotating reference location (piston and body without angular movement). This cylinder is fed by pipes via a hydraulic spool positioned in the fixed reference location. In this hydraulic concept, the rotation of the propeller does not cause any offset of the propeller pitch. The fourth problem (problem D) relates to the management of this phenomenon.

Finally, the fifth problem (problem E) relates to the protection functions other than that covering the failure of the pitch control, which functions require additional mechanical and hydraulic devices in a hydraulic system of the prior art.

Embodiments of the present disclosure propose a pitch actuation system for a turbine engine propeller. In an embodiment, the system includes an actuator, a movable part of which is designed to be connected to blades of the propeller so as to rotate them relative to the blade pitch-setting axes, the actuator being an electromechanical actuator, and comprising:
  at least two electric motors for driving a common rotor; and
  a transmission screw rotated by the common rotor,
  the system further comprises a nut, through which the transmission screw passes and which is designed to cooperate with the blades so as to move them,
  wherein the common rotor is connected to the transmission screw by a reduction gear, the reduction gear comprising:
    a planetary shaft constrained to rotate with the common rotor;
    an external ring gear that surrounds the planetary shaft and is rigidly connected to a stator casing; and
    planet gears that mesh with the planetary shaft and the ring gear and are supported by a planet carrier which is constrained to rotate with the transmission screw.

The hydraulic actuator of the prior art is thus replaced by one or more embodiments of an electromechanical actuator, the movable part of which comprises a transmission, such as a lead screw. The rotation of the blades is obtained by a translational movement of a corresponding nut on the transmission screw, which screw is rotated by the rotor common to the electric motors.

This electromechanical concept, by virtue of the electric redundancy in the electric motors, allows the FHA reliability requirements to be met (problem A). In order to maintain a simple architecture, sharing the rotors of the electric motors is proposed here. This makes it possible to maintain just one transmission chain and to provide a relatively compact system. The proposed concept offers this advantage, among others.

The proposed system is capable of providing the required reliability through electric redundancy both on the electrical components and on the control and on independent power supply circuits controlled by a computer. This system is thus capable of providing its pitch control function even in the event of a short-circuit in the electrical power supply.

This electromechanical concept in some embodiments may not require any mechanical energy originating from the turbine engine. Malfunctions involving loss of engine power and engine cut-out can thus be covered by the nominal electromechanical system without any additional device by means of a protection unit. This electromechanical concept also allows the event of overspeed and the failure of the FADEC to be covered without an additional device.

In a hydraulic system, a blade of the propeller is rotated by the translational movement of an eccentric member at the root of the blade. A failure resulting from the axial locking of the hydraulic cylinder (problem C), which generates this translational movement, is considered to be highly unlikely. This low malfunction rate value appears to be supported by feedback. According to embodiments of the present disclosure, the system does not have to comprise transmission screw redundancy. It is also assumed that the failure rate thereof is low, which can be demonstrated by the low failure rates from applications that integrate transmissions screws.

The actuator casing is fixed (stator), whereas the nut mounted on the transmission screw is constrained to rotate with the propeller. To prevent this rotation of the nut from causing translation thereof on the transmission screw and thus variation in the pitch of the blades, the transmission screw is kept continuously rotating and thus the electric motors are continuously operating; maintaining the pitch thus requires continuous rotation of the rotors of the motors. Pitch control is managed by the differences in rotational speeds between the propeller and the electric motors (which thus provides a solution to the aforementioned problem D).

With respect to problem E, the proposed concept does not require any additional device, unlike the hydraulic system, in order to cover the protection functions other than that covering the failure of the pitch control. In a hydraulic system, the event of engine cut-out or loss of engine power results in a suppression of the hydraulic energy of the pump coupled to the engine, and an auxiliary system needs to be provided. In an electromechanical system, in the event of these types of malfunctions, the electrical energy is delivered by an independent source. The feathering function thus remains active in order to cover these types of malfunctions, preferably by means of a protection unit. In a hydraulic system, the event of overspeed is covered by a mechanical counterweight system. In the electromechanical system, by virtue of, for example, speed feedback, the engine control laws can act on the electric motors for pitch control via the protection unit in order to provide the feathering.

The system according to embodiments of the present disclosure can comprise one or more of the following features, taken independently of one another or in combination with one another:

the common rotor and/or the transmission screw are rotatably guided in the casing by at least one bearing;

a pair of angular contact bearings are mounted between the transmission screw and the casing;

the transmission screw and the planet carrier are formed as a single piece;

the electric motors and the reduction gear are surrounded by the casing;

at least two resolvers are provided;

the electric motors are synchronous machines, the selection of the technology and the strategy for sizing the electrical system allows the short-circuit torque to be minimised and results in reasonably sized motors;

the actuator further comprises electrical means for feathering the blades, which means comprise at least one electric motor, such as an asynchronous machine, for driving the common rotor; the selection of the electrical machine for feathering allows the size of the control unit to be reduced and any resistant torque associated with a short-circuit (problem B) to be eliminated;

the electrical means are surrounded by the casing;

the two electric motors are respectively connected to two electronic control units that are each designed to be active when the other is passive, and vice versa.

Embodiments of the present disclosure further relate to a turbine engine, such as a turboprop engine, comprising a propeller, the blades of which are variable-pitch blades, and to a system as previously described, in which the nut cooperates with eccentric members provided on plates for supporting and rotating the blades.

Embodiments of the present disclosure further relate to methods for actuating the pitch of the blades of a turbine engine propeller, by a system as previously described, comprising the following steps:

maintaining the blade pitch by synchronising the speed of the electric motors with the speed of the propeller, so that the common rotor and the propeller rotate at the same angular speed; and modifying the blade pitch by desynchronising the speed of the electric motors from the speed of the propeller, so that the common rotor rotates at an angular speed different from that of the propeller.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
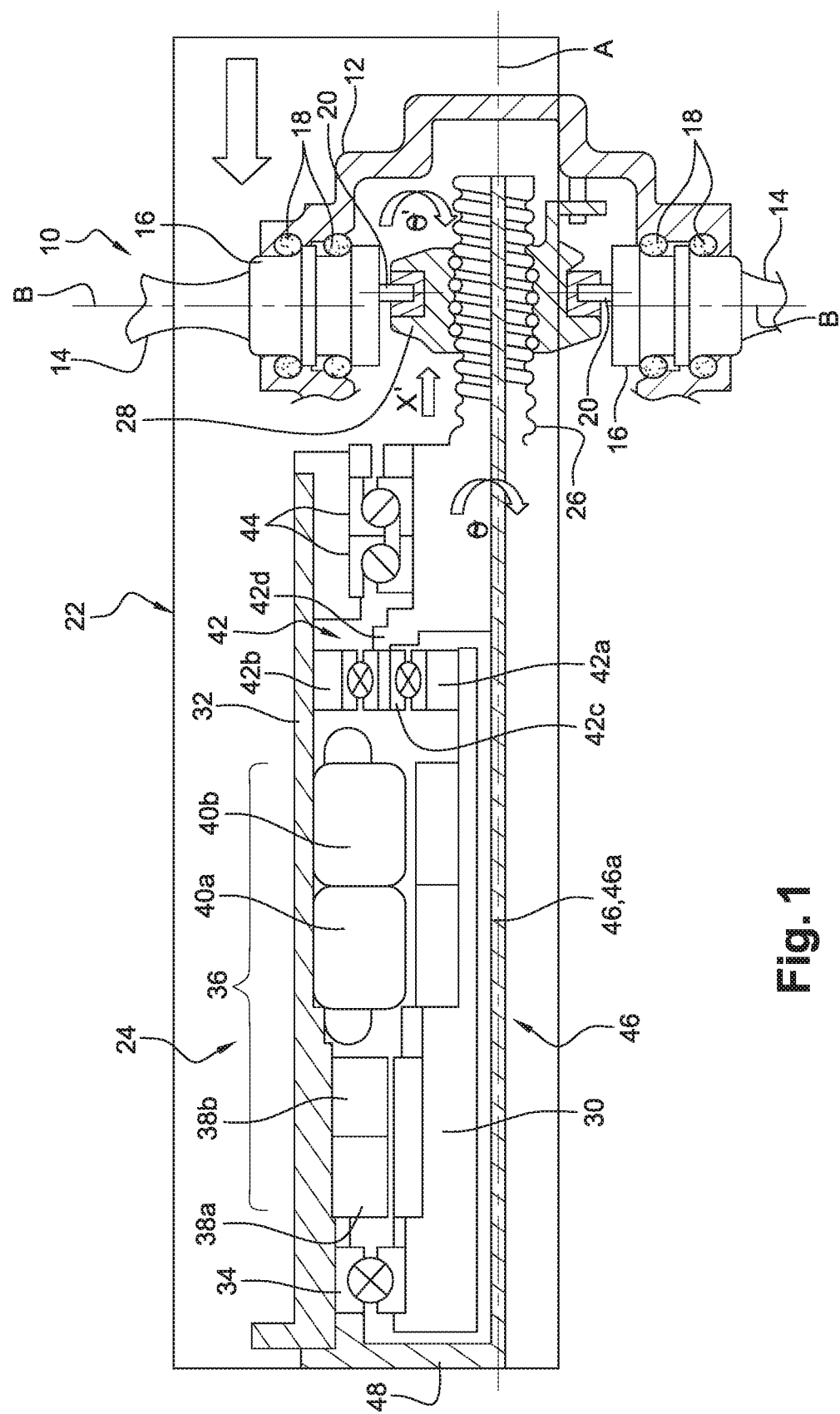
FIG. 1 is a partial, schematic half view in axial section of a blade pitch actuation system associated with a turbine engine propeller, and shows a first embodiment of the disclosure.

Embodiments of the present disclosure are described on the basis of specific examples and with reference to the drawings, but such embodiments should not be limited thereby. The drawings described are only schematic and are not limiting. In the drawings, identical or similar elements may have the same reference signs.

In the context of the present disclosure, the terms "first" and "second" are used only to differentiate the different elements and do not imply an order between these elements.

Reference will now be made to FIG. 1. As shown in FIG. 1, a propeller 10 for a turbine engine, and particularly a turboprop engine, is generally unducted and comprises a movable hub 12 (arrow θ' in FIG. 1) having an axis of rotation A, the hub supporting blades 14 which extend substantially radially relative to the axis A. Each blade 14 is connected at its radially internal end to a substantially cylindrical plate 16 for supporting and rotatably guiding the blade in order for it to rotatably pitch about an axis B, which in this case is substantially radial. The plate 16 of each blade 14 is mounted in a compartment of the hub 12 and is centred and guided in this compartment by bearings 18 extending about the axis B. The radially internal end of each blade comprises an eccentric member 20 which is rigidly connected to the plate 16 and can be rotated about the axis B by an actuation system 22. The movement of the eccentric members 20 causes the plates 16 and thus the blades 14 to rotate about the axes B. Each blade 14 can be set to a pitch or to a given position about its axis B, between two extreme positions, one of which, called the feathering position, corresponds to the case where the chord of the transverse section of the blade extends substantially parallel to the axis A.

In the prior art, the actuation system was hydraulic and had various disadvantages. Contrastingly, FIG. 1 shows a first embodiment of the disclosure that comprises using an electromechanical actuation system.

The actuation system 22 of FIG. 1 comprises an electromechanical actuator 24, the movable part of which comprises a transmission or lead screw 26 that is associated with a nut 28 and is guided in translation relative to the hub 12. The transmission screw 26 is configured to cooperate with the eccentric members 20 of the blades 14 so as to rotate the blades relative to the axis B.

The nut 28 comprises compartments intended to receive the eccentric members 20 and to drive them when the nut 28 is moved. Each compartment receives, for example, a shaft of an eccentric member 20 of the corresponding blade 14, each shaft being arranged so as to project into the compartment. The nut is thus constrained to move with the blades, and thus the propeller when it is rotating relative to the axis A. The nut 28 is thus arranged so as to be rotatable relative to the axis A in a fixed reference location.

The transmission screw 26 extends along the axis A and is rotatable relative to the axis A. The screw 26 passes through the nut 28 and thus comprises a thread that is complementary to that of the nut 28. The nut 28 is thus likewise arranged so as to be translatable relative to the axis A in the same fixed reference location. The transmission screw 26 in some embodiments is configured or arranged to have a reversible function in that it can be subjected to a rotation torque by the actuator so as to cooperate with and move the nut, and it also can be subjected to axial forces by the nut, causing the transmission screw to be set into rotation. In this respect, these embodiments of screw 26 differ from an endless screw, which has an irreversible function.

It is understood that the rotation of the transmission screw 26 (arrow θ in FIGURE A) causes a translational movement of the nut 28 along the axis A. The rotation of the transmission screw 26 thus causes a translation of the nut 28, which in turn causes a movement of the eccentric members 20 and rotation of the blades 14 relative to the axis B. The arrow X' represents the axial movement of the nut along the axis A and the arrow θ' represents the rotation of a blade 14 about an axis B.

The transmission screw 26 is driven by a common rotor 30 of the actuator 24 that is centred and guided by bearings in a stator casing 32 in the example shown. The stator casing 32 is thus fixed. The casing has a generally cylindrical elongate shape having an axis A.

The common rotor 30 has an elongate shape having an axis A and in this case is guided in the stator casing 32 by at least one bearing 34. The bearing 34, in this case a roller bearing and more specifically a ball bearing, is mounted at the axial end of the actuator, opposite the propeller (left-hand end in the drawing).

In some embodiments, the actuator 24 comprises a first electrical means 36 for controlling blade pitch. In the example shown, the first electrical means 36 comprise two resolvers 38a, 38b and two electric motors 40a, 40b, which in this case are synchronous machines. The resolvers 38a, 38b are arranged next to each other and have the axis A as a common axis. The electric motors 40a, 40b are arranged next to each other and also have the axis A as a common axis. The resolvers 38a, 38b in this case are arranged between the bearing 34 and the electric motors 40a, 40b.

Each resolver 38a, 38b comprises a resolver rotor mounted on the common rotor 30 and a resolver stator rigidly connected to the stator casing 32. The resolver rotors and stators are generally made up of windings. The resolver allows an electric value to be obtained on the basis of a change of angle of a rotor. In these embodiments, the resolver operates as a transformer, the coupling of which varies with the mechanical angle of the rotor. When the rotor winding is excited using an alternating voltage, an alternating voltage is recovered on the winding of the stator. The redundancy associated with the use of two resolvers 38a, 38b instead of one allows the aforementioned reliability requirements to be met.

Each electric motor 40a, 40b in this embodiment is of the synchronous machine type and comprises a rotor mounted on the common rotor 30 and a stator rigidly connected to the stator casing 32. The rotor can be made up of permanent magnets or can be made up of a winding fed by direct current and a magnetic circuit (electromagnet). In order to produce the current, an outside force is used to rotate the rotor: the magnetic field thereof, by rotating, induces an alternating electric current in the windings of the stator. The speed of this rotating field is called "synchronism speed". The synchronism speed is directly associated with the frequency of the electrical power supply. The motors in this case are fed by a three-phase current system.

As can be seen in the drawing, the transmission screw 26 is driven by the common rotor 30 using a speed-reduction gear 42, which in this case is a planetary gear unit or an epicyclic reduction gear. This reduction gear 42 comprises a planetary shaft 42a constrained to rotate with the common rotor 30, an external ring gear 42b that surrounds the planetary shaft and is rigidly connected to the casing 32, planet gears 42c that mesh with the planetary shaft 42a and the ring gear 42b and are supported by a planet carrier 42d which in this case is constrained to rotate with the transmission screw 26. In the example shown, the transmission screw 26 and the planet carrier 42d are formed as a single piece.

The part comprising the planet carrier 42d and the transmission screw 26 is centred and guided in the stator casing 32 by a pair of roller bearings, in this case ball bearings. These bearings 44 are angular contact bearings. They are inverted and mounted next to each other at the axial end of the actuator located on the side of the propeller 10 (right-hand end in the drawing).

The actuation system 22 further comprises at least one sensor 46 of the LVDT (Linear Variable Differential Transformer) type. In the example shown, the transmission screw 26 comprises an internal axial bore, in which a ferromagnetic LVDT plunger 46a is engaged in a sliding manner, which plunger is supported by a rear cowl 48 of the actuator 22, which itself is fixed to the stator casing 32. Even though it is not shown, the plunger 46a is surrounded by a plurality of windings supported by the transmission screw 26, at least one primary winding of which is fed by an alternating current, and two secondary windings. These windings in some embodiments are redundant in order to increase the reliability of the system. The axial movement of the plunger 46a inside the windings channels the flow and generates voltages in the secondary windings, the amplitudes of which depend on the position of the plunger. The sensor 46 thus provides a voltage that is proportional to the movement of the plunger 46a.

In the embodiment in FIG. 1, the turboprop engine is equipped with an auxiliary system for feathering the blades 14, which system is not shown and which comprises counterweights that equip the blades 14 or their plates 16 and that are intended to provide the emergency feathering of the blades in the event of a failure of the actuator 24. This auxiliary system is thus mechanical.

Figure 2:
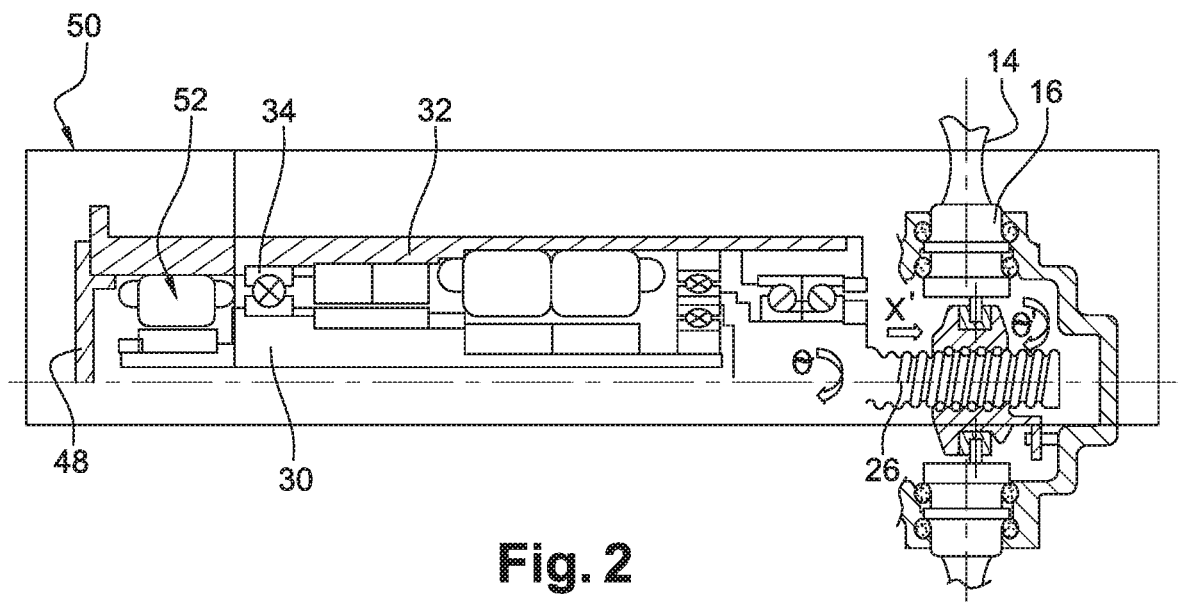
FIG. 2 is a partial, schematic half view in axial section of a blade pitch actuation system associated with a turbine engine propeller, and shows a second embodiment of the disclosure.

The variant in FIG. 2 differs from the preceding embodiment in that the auxiliary system, generally designated 50, for feathering the blades 14 is electromechanical. In this case, the system 50 is integrated in the actuator 22 and comprises an electric motor 52 which is preferably an asynchronous machine (so as not to generate resistant torque), the stator of which is rigidly connected to the stator casing 32 and the rotor of which is rigidly connected to the common rotor 30. In the example shown, the electric motor 50 is mounted between the rear cowl 48 and the bearing 34.

The use of the electromechanical system according to embodiments of the disclosure for feathering offers the following advantages: the control unit is simple and is highly reliable, there is no need to cover the event of short-circuiting, synchronous machines do not need to be oversized in order to cover this type of malfunction, in the absence of short-circuiting induced by this motor, the rotor can be mounted directly onto the shaft of the rotor of the synchronous machines and can benefit from the gear reduction ratio. No addition of reduction gears is necessary.

In the two previously described embodiments, the stator casing 32 is in a fixed reference location and the nut 28 is in the rotating reference location of the propeller 10 because it is rotated by the eccentric members 20 of the blades 14. In order to prevent the nut 28 from moving in translation on the transmission screw 26 (which would modify the blade pitch), the transmission screw 26 is configured and arranged to rotate at the same angular speed as the propeller. In order to maintain the blade pitch, the speed of the motors 40a, 40b is synchronised with the speed of the propeller 10. Otherwise, in order to vary the pitch of the blades, the speed of the electric motors is desynchronised from the speed of the propeller.

Figure 3:
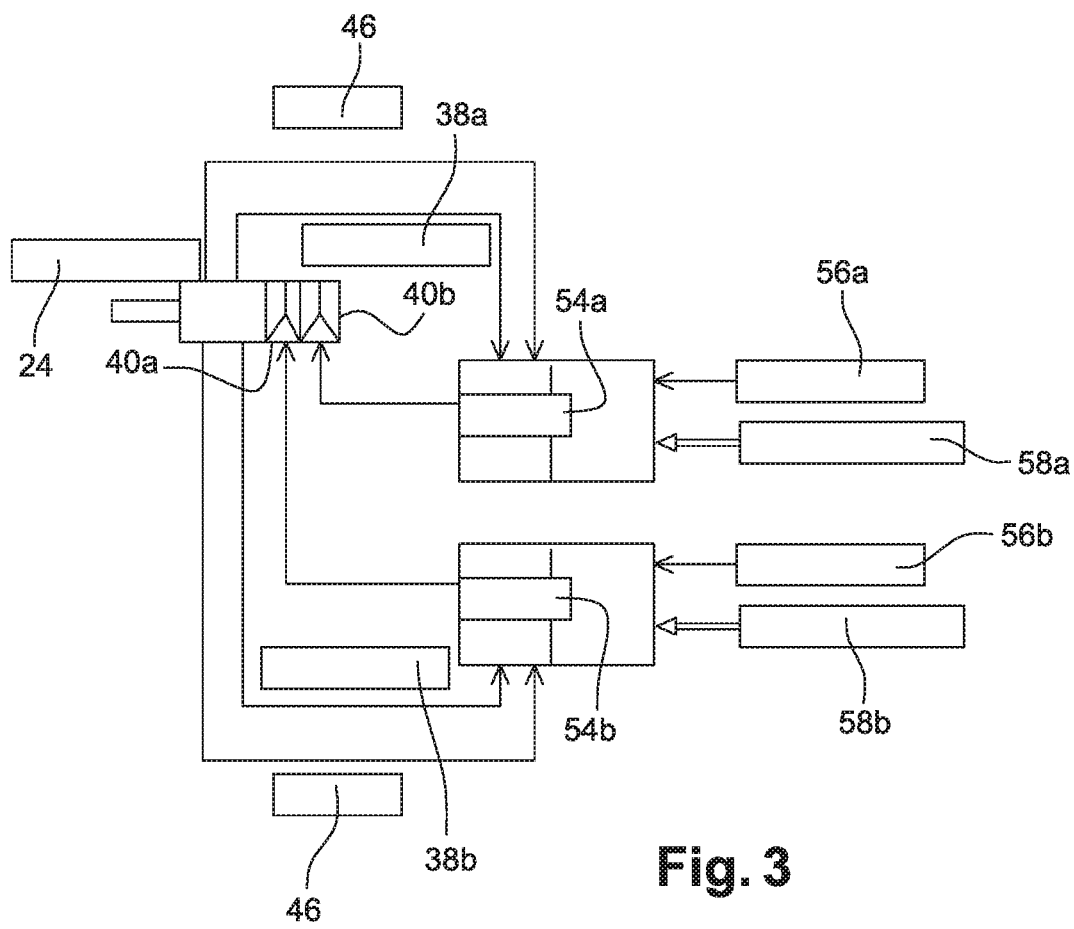
FIG. 3 is a block diagram showing the general architecture of the actuation system according to the embodiments of the disclosure and means for electrically controlling this system.

Reference will now be made to FIG. 3, which schematically shows the circuit diagram of the operation of the system of each of FIGS. 1 and 2. The elements previously described are denoted using the same reference signs in FIG. 3.

FIG. 3 shows one embodiment of the means for controlling the electrical machines of the system, namely, in the event that the redundancy is applicable to all of these machines, two LVDT sensors 46, two resolvers 38a, 38b and two electric motors 40a, 40b. In some embodiments the control means comprise two separate electronic control units 54a, 54b that are each connected to a resolver, a sensor and an electric motor, and that are able to independently control these machines.

The electric control units 54a, 54b in some embodiments operate in "passive-active" mode. In nominal mode, the pitch is controlled by the electronic control unit 54a, for example, and the electronic control unit 54b is in passive mode. In the event of a malfunction detected by a position error, for example, the unit 54a is deactivated and the unit 54b is activated. The units 54a, 54b comprise three local interlocked servo-control loops: a torque loop using the phase current measurements, a speed loop using the resolver, and a linear position loop using the LVDT sensor. The units 54a, 54b receive the position setpoint from computation units 56a, 56b, respectively, and are associated with electric networks 58a, 58b in order to send a current command to the motors 40a, 40b.

Even though it is not shown in FIG. 3, in the case of the variant in FIG. 2, the control means further comprises in some embodiments an independent electrical power supply device for the electric motor 52.

This concept of the electromechanical type for the pitch actuation system is highly innovative as it offers the following advantages, among others:
 a) a simple and robust architecture having a minimum number of electromechanical components, whilst complying with the strict reliability criteria;
 b) elimination of the malfunction associated with hydraulic leakage, which would require the addition of counterweights for feathering;
 c) elimination of the counterweights in the case of the variant in FIG. 2; and
 d) elimination of any additional devices for covering malfunctions other than that which is associated with the failure of the pitch control.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A pitch actuation system for a turbine engine propeller having a number of blades, comprising:
 an actuator, a movable part of which is configured to be connected to the number of blades of the propeller so as to rotate said blades relative to blade pitch-setting axes, the actuator being an electromechanical actuator, and comprising:
 at least two electric motors for driving a common rotor; and
 a transmission screw rotated by said common rotor,
 a nut, through which said transmission screw passes and which is configured to cooperate with the blades so as to move said blades, said common rotor being connected to the transmission screw by a speed-reduction gear, wherein said speed-reduction gear is an epicyclic reduction gear and comprises:
- a planetary shaft constrained to rotate with said common rotor;
- an external ring gear that surrounds said planetary shaft and is rigidly connected to a stator casing, and
- planet gears that mesh with said planetary shaft and said ring gear and are supported by a planet carrier which is constrained to rotate with the transmission screw.

2. The pitch actuation system according to claim 1, wherein said common rotor and/or said transmission screw are rotatably guided in said stator casing by at least one bearing.

3. The pitch actuation system according to claim 1, wherein a pair of angular contact bearings are mounted between said transmission screw and said stator casing.

4. The pitch actuation system according to claim 1, wherein said transmission screw and said planet carrier are formed as a single piece.

5. The pitch actuation system according to claim 1, wherein at least two electric motors and said speed-reduction gear are surrounded by said stator casing.

6. The pitch actuation system according to claim 1, further comprising at least two resolvers.

7. The pitch actuation system according to claim 1, wherein said electric motors are synchronous machines.

8. The pitch actuation system according to claim 1, wherein the actuator further comprises electrical means for feathering the blades, which means comprise at least one electric motor for driving said common rotor.

9. The pitch actuation system according to claim 1, wherein said at least two electric motors are respectively connected to two electronic control units, which are each configured to be active when the other is passive, and vice versa.

10. A turbine engine propeller, comprising a propeller, the blades of which are variable-pitch blades, and a system according to claim 1, wherein the nut cooperates with eccentric members provided on plates for supporting and rotating the blades.

11. A method for actuating the pitch of the blades of a turbine engine propeller using a system according to claim 1, comprising:
- maintaining the pitch of the blades by synchronising the speed of the at least two electric motors with the speed of the propeller, so that said common rotor and the propeller rotate at the same angular speed, and
- modifying the blade pitch by desynchronising the speed of the at least two electric motors from the speed of the propeller, so that said common rotor rotates at an angular speed different from that of the propeller.

* * * * *